United States Patent
Oriet et al.

(10) Patent No.: US 8,215,692 B2
(45) Date of Patent: Jul. 10, 2012

(54) ADJUSTABLE LENGTH DELIVERY VEHICLE

(75) Inventors: Leo P. Oriet, Rochester Hills, MI (US); Andre Bocancea, Windsor (CA); Jules Cazabon, Staples (CA)

(73) Assignee: Navistar Canada, Inc. (CA)

( * ) Notice: Subject to any disclaimer, the term of this patent is extended or adjusted under 35 U.S.C. 154(b) by 441 days.

(21) Appl. No.: 12/506,373

(22) Filed: Jul. 21, 2009

(65) Prior Publication Data

US 2011/0017527 A1 Jan. 27, 2011

(51) Int. Cl.
*B60P 3/34* (2006.01)
*B62C 1/06* (2006.01)

(52) U.S. Cl. .................... 296/26.08; 180/65.1
(58) Field of Classification Search ............... 180/65.1; 296/26.01–26.15, 181.7
See application file for complete search history.

(56) References Cited

U.S. PATENT DOCUMENTS

| | | | | |
|---|---|---|---|---|
| 2,606,058 A | | 8/1952 | Chausson | |
| 2,678,231 A | * | 5/1954 | Barenyi | 296/193.03 |
| 3,034,824 A | * | 5/1962 | Schubach | 296/181.7 |
| 3,100,458 A | | 8/1963 | Baker | |
| 3,794,374 A | | 2/1974 | Manning | |
| 3,966,075 A | * | 6/1976 | Schultz | 220/1.5 |
| 4,108,326 A | * | 8/1978 | Bertolini | 220/1.5 |
| 4,133,571 A | * | 1/1979 | Fillios | 296/165 |
| 4,254,987 A | | 3/1981 | Leonardis | |
| 4,282,641 A | * | 8/1981 | Phillips | 29/416 |
| 4,469,369 A | | 9/1984 | Belik et al. | |
| 4,599,780 A | * | 7/1986 | Rohrbacher | 29/401.1 |
| 4,787,670 A | * | 11/1988 | Bentz | 296/182.1 |
| 4,887,859 A | * | 12/1989 | Aper | 296/26.08 |
| 4,995,664 A | * | 2/1991 | Buday | 296/165 |
| 5,108,144 A | * | 4/1992 | Crowley | 296/165 |
| 5,131,714 A | * | 7/1992 | Evans et al. | 296/182.1 |
| 5,310,239 A | * | 5/1994 | Koske et al. | 296/26.08 |
| 5,449,081 A | | 9/1995 | Sjostedt et al. | |
| 5,524,951 A | * | 6/1996 | Johnson | 296/37.6 |
| 5,649,731 A | * | 7/1997 | Tognetti | 296/26.09 |
| 5,669,999 A | | 9/1997 | Anderegg et al. | |
| 6,062,632 A | | 5/2000 | Brachos et al. | |
| 6,138,783 A | * | 10/2000 | Chene et al. | 180/11 |
| 6,199,894 B1 | * | 3/2001 | Anderson | 280/638 |
| 6,213,531 B1 | * | 4/2001 | Corey et al. | 296/26.09 |

(Continued)

FOREIGN PATENT DOCUMENTS

CA 2349213 11/2002

(Continued)

*Primary Examiner* — John R Olszewski
*Assistant Examiner* — Jacob Meyer
(74) *Attorney, Agent, or Firm* — Jeffrey P. Calfa; Mark C. Bach

(57) ABSTRACT

A vehicle is constructed of three modules including a front end module having a monocoque one piece body, a tail module having a monocoque one piece body and a power train module adapted for installation under at least one of the front end module and the tail module. The front end module has a trailing edge and the tail module has a leading edge along which the tail module and front end module may be temporarily connected for service use. A power train module is provided adapted for installation under at least one of the front end module and the tail module. An expansion band formed in a monocoque one piece section and having a leading edge and a trailing edge is provided allowing temporary installation between the front end module and the tail module to adjust the length of the vehicle.

7 Claims, 9 Drawing Sheets

U.S. PATENT DOCUMENTS

| | | | |
|---|---|---|---|
| 6,237,989 B1 | 5/2001 | Ammerlaan et al. | |
| 6,257,638 B1 * | 7/2001 | Graber | 296/26.09 |
| 6,276,748 B1 * | 8/2001 | Gobessi et al. | 296/190.02 |
| 6,450,522 B1 * | 9/2002 | Yamada et al. | 280/414.5 |
| 6,474,714 B1 * | 11/2002 | Stettner | 296/26.08 |
| 6,517,135 B2 * | 2/2003 | de Gaillard | 296/26.09 |
| 6,609,743 B1 * | 8/2003 | Stevenson | 296/26.11 |
| 6,773,056 B2 * | 8/2004 | Fischer et al. | 296/190.08 |
| 6,883,860 B1 * | 4/2005 | Budge | 296/190.08 |
| 6,899,379 B1 * | 5/2005 | Milenovich | 296/190.02 |
| 6,929,301 B2 * | 8/2005 | Kim et al. | 296/24.33 |
| 7,052,033 B2 * | 5/2006 | McDonell | 280/656 |
| 7,152,913 B2 * | 12/2006 | Milenovich | 296/190.02 |
| 7,207,616 B2 * | 4/2007 | Sturt | 296/26.1 |
| 7,216,911 B2 * | 5/2007 | Andre et al. | 296/26.08 |
| 7,243,966 B1 * | 7/2007 | Sheldon | 296/26.08 |
| 7,263,754 B1 * | 9/2007 | Henry | 29/401.1 |
| 7,275,901 B2 * | 10/2007 | Carroll | 410/24.1 |
| 7,287,779 B2 * | 10/2007 | Miller | 280/781 |
| 7,325,475 B2 * | 2/2008 | Long | 89/36.08 |
| 7,393,036 B2 * | 7/2008 | Bastian et al. | 296/26.09 |
| 7,441,809 B1 * | 10/2008 | Coombs et al. | 280/785 |
| 7,523,978 B1 | 4/2009 | Timmermans et al. | |
| 7,722,104 B2 * | 5/2010 | Nichols | 296/26.08 |
| 7,779,949 B2 * | 8/2010 | Oriet et al. | 180/209 |
| 7,789,427 B2 * | 9/2010 | Oriet et al. | 280/782 |
| 7,810,876 B2 * | 10/2010 | Hedderly | 296/193.08 |
| 7,849,601 B2 * | 12/2010 | Hedderly | 29/897.2 |
| 7,922,229 B1 * | 4/2011 | Castillo et al. | 296/26.11 |
| 7,967,356 B2 * | 6/2011 | Stackpole | 296/26.09 |
| 7,971,918 B2 * | 7/2011 | Oriet et al. | 296/26.09 |
| 8,038,205 B2 * | 10/2011 | Hedderly | 296/203.03 |
| 8,123,284 B2 * | 2/2012 | Hedderly | 296/193.06 |
| 2003/0230443 A1 | 12/2003 | Cramer et al. | |
| 2004/0104568 A1 | 6/2004 | Tronville et al. | |
| 2004/0245794 A1 * | 12/2004 | McManus et al. | 296/26.08 |
| 2005/0012353 A1 * | 1/2005 | Winter | 296/26.08 |
| 2005/0206180 A1 * | 9/2005 | Andre et al. | 296/26.08 |
| 2007/0102947 A1 * | 5/2007 | Zhou | 296/26.08 |
| 2007/0182185 A1 * | 8/2007 | Nichols | 296/26.08 |
| 2011/0018298 A1 * | 1/2011 | Oriet et al. | 296/26.09 |
| 2011/0169290 A1 * | 7/2011 | Sheikhha et al. | 296/26.09 |

FOREIGN PATENT DOCUMENTS

| | | |
|---|---|---|
| DE | 4220438 A1 * | 12/1993 |
| EP | 0640049 B1 | 1/1998 |
| EP | 1138567 A3 | 8/2006 |
| WO | 03/057529 A2 | 7/2003 |

* cited by examiner

ADJUSTABLE LENGTH DELIVERY VEHICLE

BACKGROUND

Embodiments described herein relate to self propelled vehicles, particularly general delivery vehicles employed for local package delivery and pickup.

Parcel delivery vehicles have conventionally been built using body on frame construction. This style of construction has made heavy use of steel, with some use of lighter weight materials. The power plant and drive train layout has relied on an internal combustion engine configured in a front engine, rear wheel drive set up. The basic design emphasizes simplicity, ease of access to the engine and transmission for service and durability for stop and go driving in urban environments. The weight, aerodynamic attributes, particularly relating to engine cooling, and inflexibility in sizing have posed fuel economy issues for application of the design to hybrid or full electric drive vehicles.

For a conventional, internal combustion engine-equipped vehicle, the inherent relative inefficiency of the internal combustion engine compared to electric motors in terms of converting stored energy to vehicle motion means that economy gains from increasing the energy conversion efficiency of the power train may exceed gains obtained from improving aerodynamics or reducing weight. Internal combustion engines also exhibit much greater parasitic and idling losses than do electric motors. Electric motors are much more efficient than diesel and other internal combustion engines, converting over 90% of the input energy to motive power. In addition, electric motors are more easily adapted to regenerative braking. However, the batteries used to store energy to supply the electricity to vehicle fraction motor energy store at vastly lower densities, and at a much greater weight penalty, than does diesel fuel. As a consequence, electric vehicles have operated under tighter range constraints than diesel-engine equipped vehicles and the range of electric vehicles is much more sensitive to vehicle weight and aerodynamics than it is for diesel-engine equipped vehicles. Range issues can be addressed by adding battery capacity, but doing so takes up space that could be used for cargo, can raise the floor level of the vehicle, and adds still more weight to the vehicle. And unlike internal combustion engine-equipped vehicles which lose weight as fuel is consumed, a vehicle using batteries to store energy does not lose weight as stored energy is exhausted.

SUMMARY

A vehicle is constructed from a front end module having a monocoque one piece body, a tail module having a monocoque one piece body and a power train module adapted for installation under at least one of the front end module and the tail module. The front end module has a trailing edge and the tail module has a leading edge along which the tail module and front end module may be temporarily connected for service use. An expansion band module formed in a monocoque one piece section and having a leading edge and a trailing edge is provided allowing temporary installation between the front end module and the tail module to adjust the length of the vehicle. The number of expansion band modules installed on a vehicle may be varied.

DETAILED DESCRIPTION

Figure 1A:
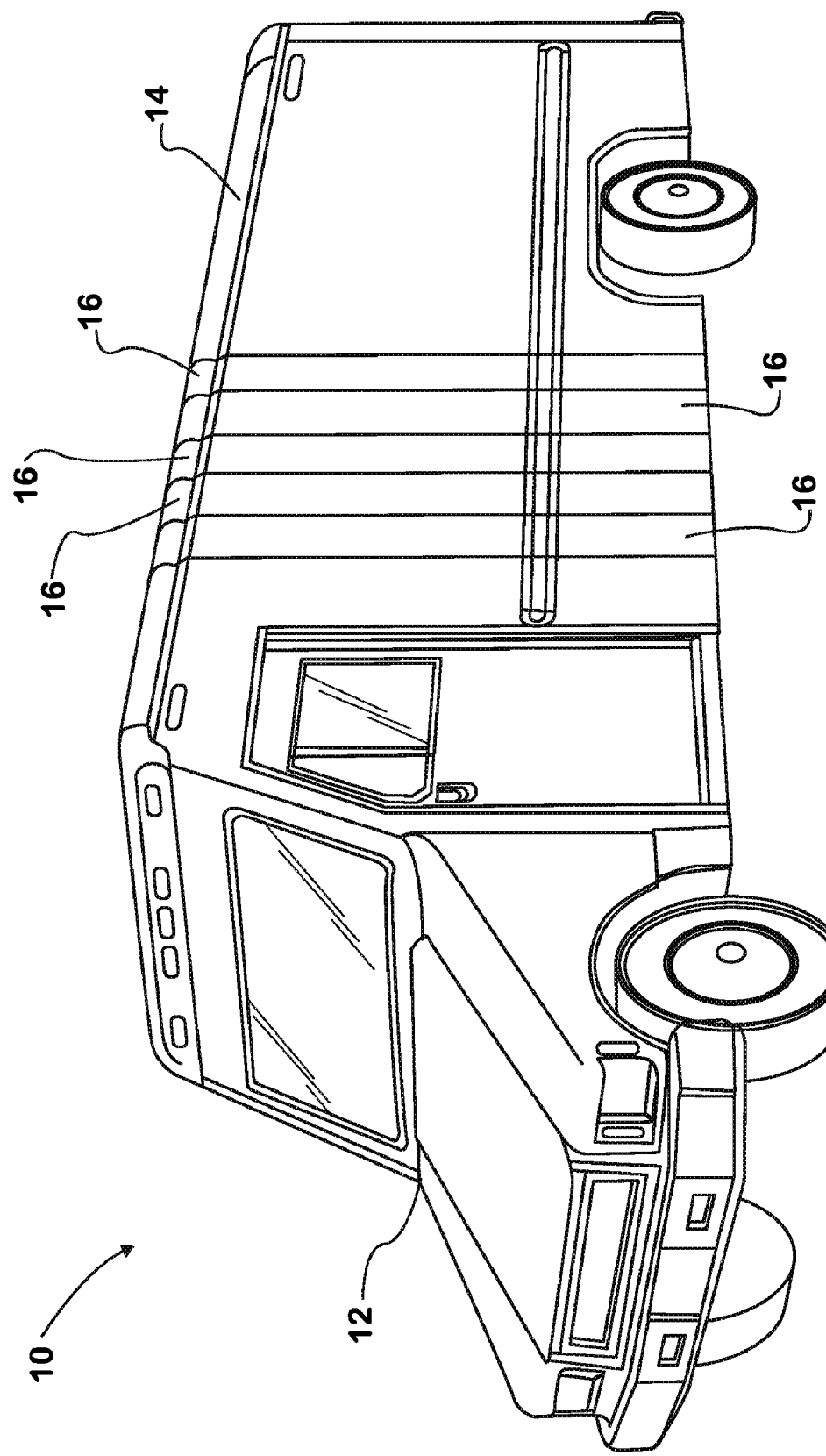
FIG. 1A is a perspective view of an adjustable length vehicle.

Referring to the Figures, and in particular to FIG. 1, an adjustable length delivery vehicle 10 comprises a front end module 12 and a tail module 14. Expansion bands 16 may or may not be fitted between the front end module 12 and the tail module 14 to vary the length of the vehicle. Front end module 12 and tail module 14 may be made interchangeable with front end modules and tail modules for other vehicles. The number of expansion bands 16 fitted may be varied from none to several bands. Fitting of expansion bands 16 is not permanent and the bands may be added or removed during the service life of the vehicle 10. This allows the size of the vehicle 10, in terms of length and weight, to be adjusted depending upon anticipated load and service application. Vehicle 10 may be an electric vehicle having front drive wheels 26. Four wheel drive and front or rear two wheel drive applications are possible. Four wheel drive would provide the more effective regenerative braking arrangement. Cost and fraction capability in particular climate conditions may be considered in selecting the drive wheel configuration.

Figure 1B:
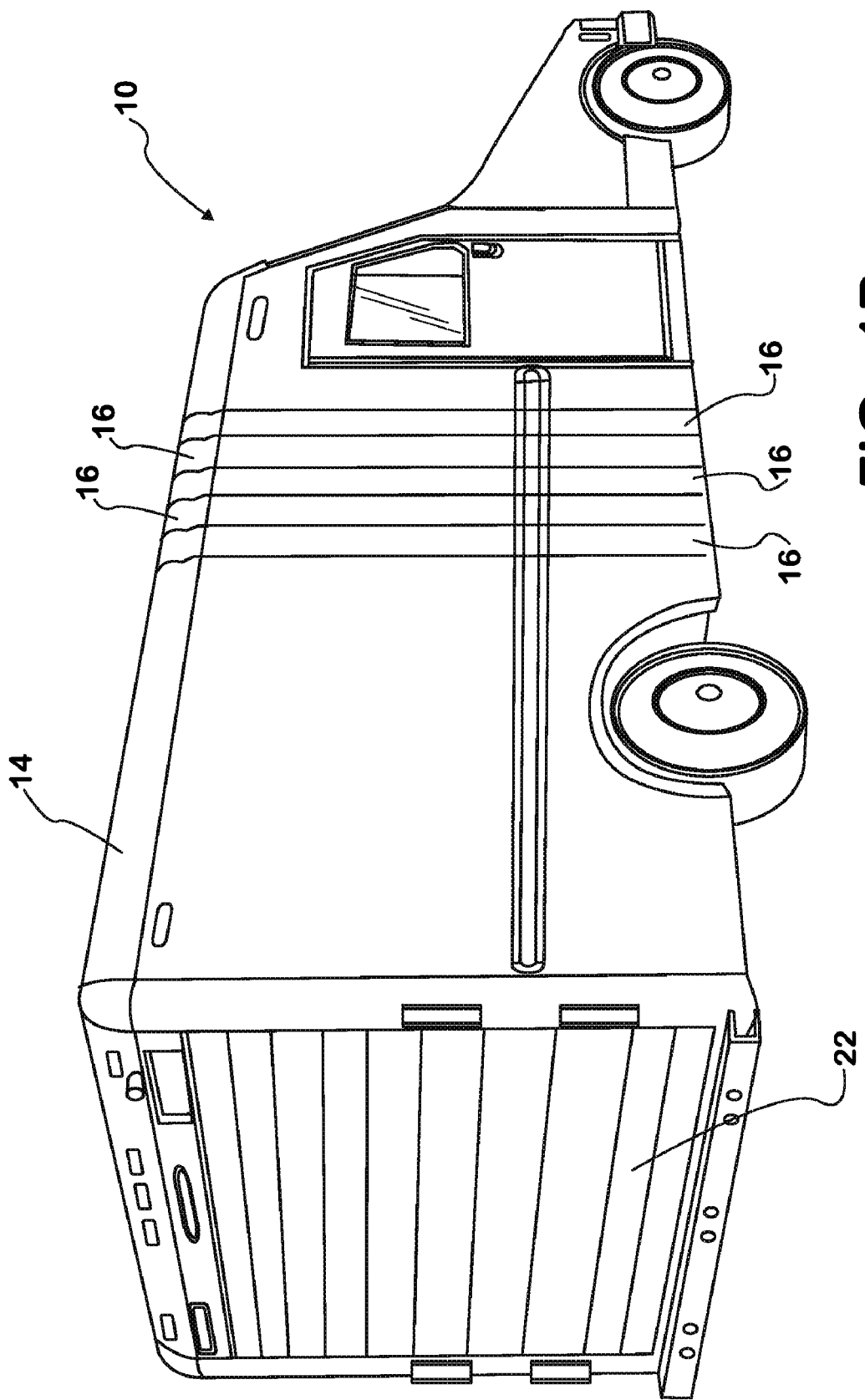
FIG. 1B is the reverse perspective to FIG. 1A.

FIG. 1B is the reverse perspective of FIG. 1A showing a rear lift gate 22. For local general delivery some operators prefer keeping the threshold height for vehicle 10 low enough for one or two step entry by a normally sized individual. Absence of a drive axle and full vehicle chassis makes it easier to reduce the threshold height of all electric versions of vehicle 10. Reducing vehicle floor height may be used to accommodate drivers with limited mobility or to speed access.

Figure 2:
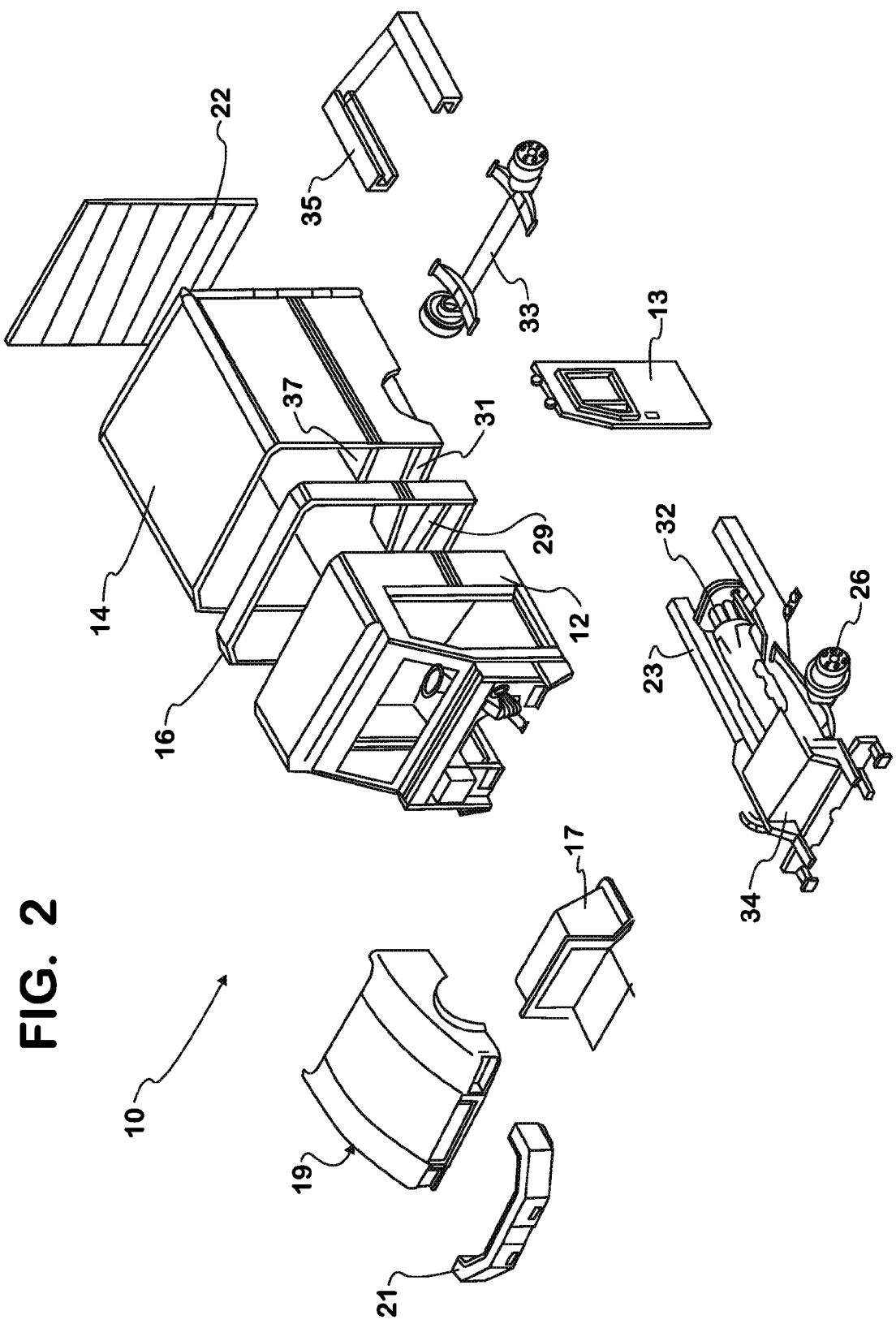
FIG. 2 is an exploded view of an adjustable length vehicle.

FIG. 2 is an exploded view of an adjustable length vehicle 10 with a single expansion band 16 located between the front end module 12 and the tail module 14 and utilizing an all electric drive system. Front end module 12 and tail module 14 may be fitted together as integral elements and may be used alone to form a complete hull/fuselage 28. Rather than having a body on frame the body of vehicle 10 is a monocoque hull/fuselage 28 (See FIG. 3) and loads are carried through the walls. The expansion bands 16 may be used to expand the hull 28 lengthwise. Expansion bands 16 are integral elements and made of structural composite materials. Integral shelves 37 may be formed in the hull elements. A removable load deck 29 is fitted within the hull 28. Disregarding possible constraints due to registration requirements there is no particular reason why front end modules 12 or tail modules 14 could not be substituted in constructing or adapting a vehicle 10 for particular operational uses.

Tail module 14 rides on a sub-chassis 35 from which a trailing axle 33 with associated wheels may be attached. For a four, all-wheel drive or rear wheel drive a power module may be substituted for sub-chassis 33. It is anticipated that such a power module would not usually provide a steering axle, though four wheel steering is not excluded. A four or all wheel drive configuration would allow all wheel regenerative braking. The traction batteries 34 may be located on the service deck 31 of the tail module 14 where they are isolated from heat generated by an optional auxiliary power unit 7 which may be located in the front end module 12.

Front module 12 rides on a front sub-chassis 23 or power train module. The power train module carries the traction motor 32. The front module 12 is fabricated as one piece with an interior wall 17 and hood 19, which are shown as detached to better illustrate positioning. The propulsion arrangements illustrated are readily combined with a diesel or other internal combustion engine to produce a hybrid system. Propulsion is not limited to the arrangement shown. Alternative electrical propulsion systems could be based on independent trailing arm wheel motor/generators or axle motor/generators. Non-electric systems are possible as well. A vehicle may be reconfigured from hybrid to all electric and back.

A lamp array sub-module 21 may be installed to the outside of the module. A door 13 provides for completing enclosure of the cab. Conventional controls and instrumentation along with a seat are installed in the cab conventionally and the details are omitted here. In a two wheel drive vehicle 10 the more vehicle weight kept over the drive wheels 26 increases the proportion of kinetic energy recaptured during regenerative braking A vehicle 10 with no expansion bands 16 would provide a minimum size vehicle for markets where traffic congestion or narrow streets place a premium on vehicle handling or where legal restrictions limit vehicle length or weight.

Figure 3:
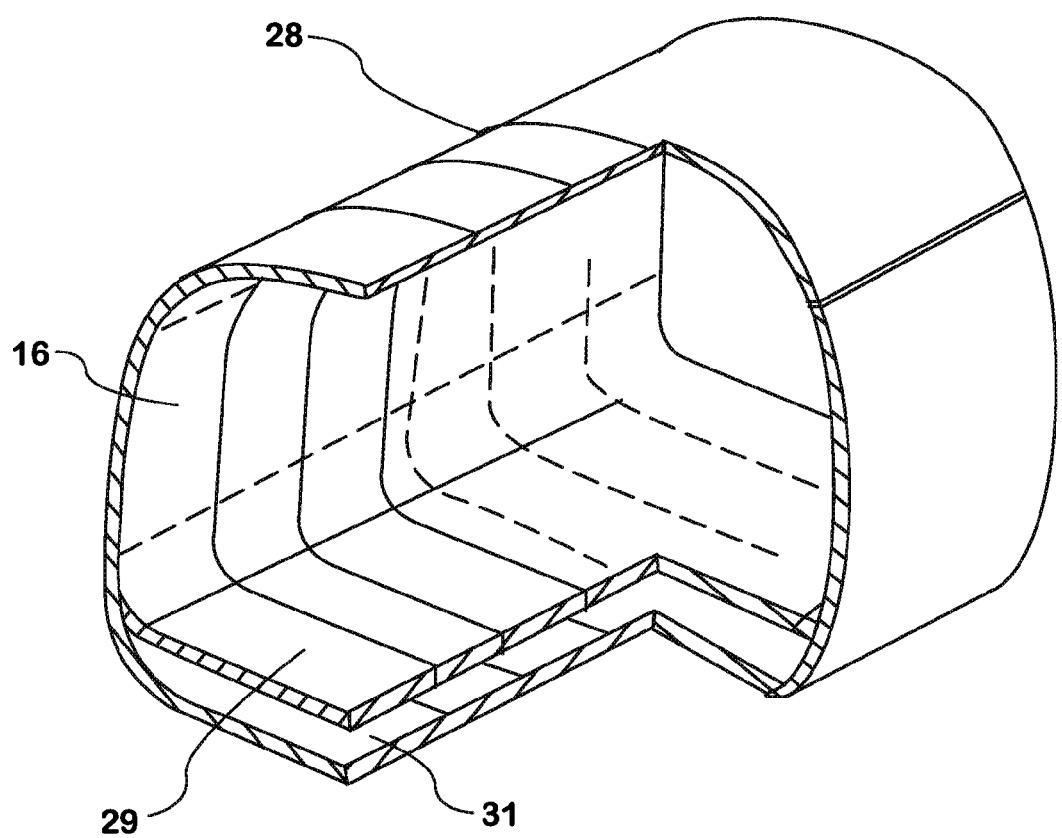
FIG. 3 is a partial cutaway view of a hull for an adjustable length vehicle.

FIG. 3 depicts a possible configuration of a hull 38 comprising three expansion bands 16. Removable deck 29 covers a service deck 31. Service deck 31 provides a location for storing traction batteries and for routing electrical connection cables, data buses, pneumatic air lines and other service related items including but limited to ventilation and cabin climate control. Making deck 29 removable allows easy access. Each expansion band 16 may be provided with its own permanently fitted traction battery set which operates to supplement the electrical storage capacity of the main traction batteries 34. Distributing the traction batteries to the expansion bands 16 means that electrical power storage capacity, and the weight associated therewith, is adjusted concurrently with removal or addition of expansion bands 16. The monocoque hull 22 configuration allows construction of a vehicle 10 without a full frame allowing a reduction in external height without loss of internal height. This reduces vehicle frontal area with consequential aerodynamic gains. As it is with weight, electric vehicles, due to the relative efficiency of electric motors over internal combustion motors, gain more proportionally from aerodynamic improvements than do internal combustion engine equipped vehicles.

Figure 5:
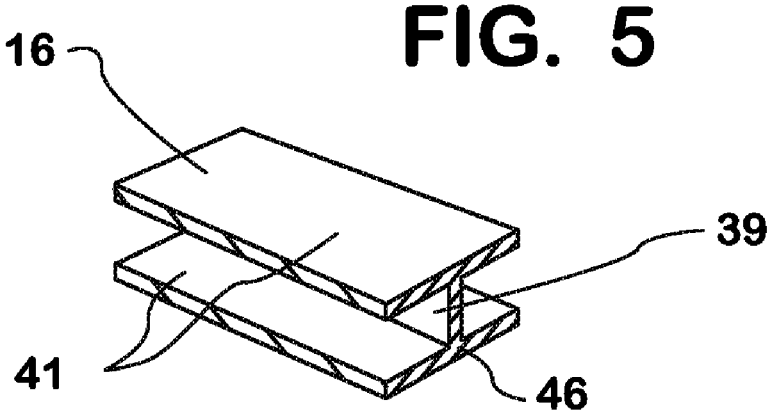
FIG. 5 is a cross sectional view of a possible profile for a section of a monocoque hull for an adjustable length vehicle.
Figure 4:
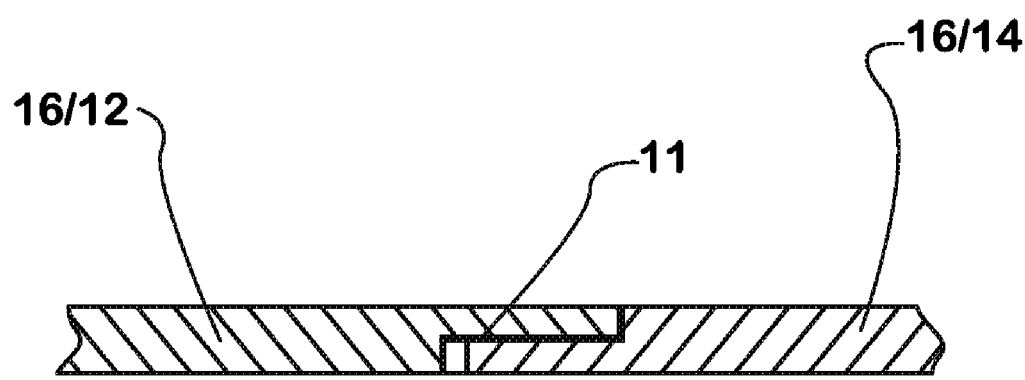
FIG. 4 is a cross sectional view illustrating joinder of elements of a hull for an adjustable length vehicle.
Figure 4:
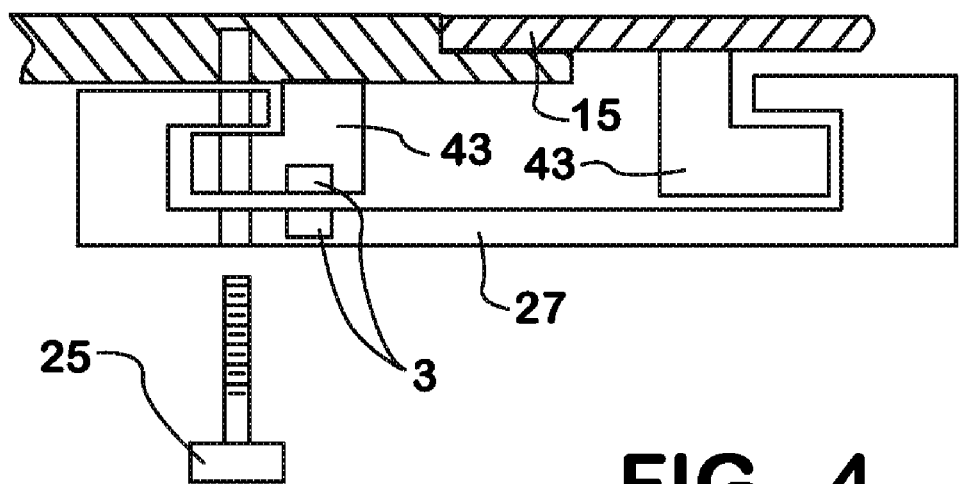

Referring particularly to FIGS. 4 and 5 the joining of the tail module 14 to the front end module 12, or the joining of an expansion band 16 to either a front end module or a tail module, and the internal construction of the hull 28 elements is illustrated. The trailing edge 11 of the front end module 12 or an expansion band 16 may be grooved 11 while the leading edge 15 of the tail module 14 or any expansion band 16 is beveled to fit tongue and groove and provide a smooth exterior surface. Hull sections such as expansion bands 16 may be molded to have an internal I-beam 46 profile with a webbing 39 connecting cross uprights 41, which provide exterior and interior walls. Webbing 39 may be provided in two mutually perpendicular directions (locally). Such an arrangement in effect gives the hull an internal ribbing support in the fashion of a monocoque fuselage while reducing weight over a solid wall. Fiber elements used to reinforce the hull may be located in the webbing 39. Molding may be done in the final desired color. Internal shelving and removable deck supports may be molded as one piece with the band 16. Band 16 width in the vehicle longitudinal direction can be made in standard sizes to meet operator specifications. Band 16 width would likely be in a variety of sizes, for example about 30 cm, 60 cm and 90 cm. Band 16 width may depend upon the geometry of the battery back to be stored on the service deck 31. Contacts 3 for a hull integrity circuit may be built into the locking mechanism.

Hulls 28 are constructed by fitting trailing sections to leading sections and then securing the sections with a linkage located internal to the hull 28. One way to do this which minimizes tool usage is to use a block 43 and bracket 27 arrangement as shown in FIG. 4. A pin 25 locks the bracket 27 onto the blocks 43. As described below and an electrical conductor may be incorporated in the sections which closes into a hull circuit upon secure fitting and locking of the sections. Such a hull circuit provides a simple test of hull 28 security which can be displayed by the vehicle gauge cluster 58 to an operator. Vehicle 10 can be lengthened or shortened by one trained worker using a roller jack stand and minimum tools and could be changed at any time by removal or addition of an expansion band 16. Maintenance issues with particular modules would allow vehicles of particular lengths to be quickly constructed ad hoc from available modules, including interchanging tail and front end modules 14, 12 provided such would be allowed under local law.

Figure 6:
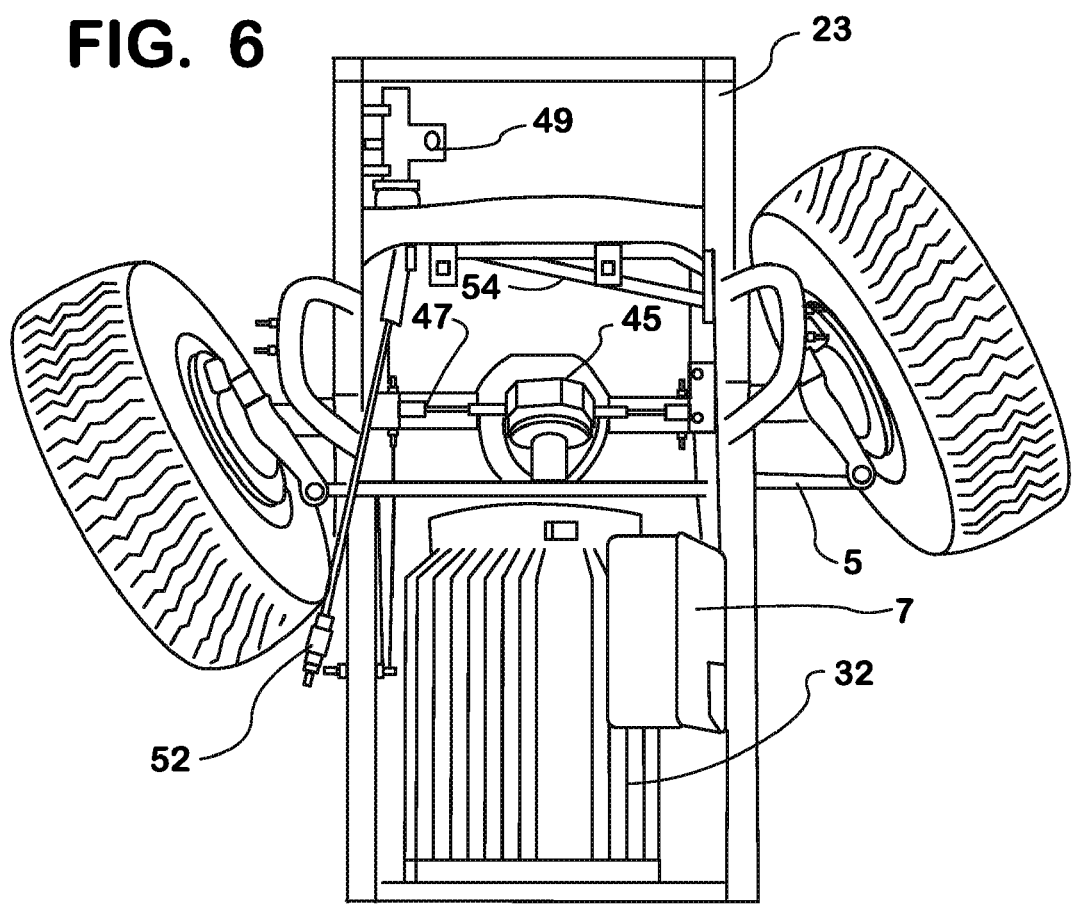
FIG. 6 illustrates a possible power train for an adjustable length vehicle.

FIG. 6 illustrates a front wheel drive assembly mounted in a sub-chassis assembly/power train module 23 which supports front end module 12. Traction motor/generator 32 rests behind a drive axle 47 and supplies power to the drive axle by connection to a differential 45. Drive axle 47 is also a steering axle and a steering shaft 52 is visible connected to a steering rack 49 which in turns moves a steering tie rod 45 and a cooperating linkage 5. Provision may be made for an auxiliary power unit (APU) 7 (sometimes referred to as a range extender) based on a small diesel engine and generator for extending the range of the vehicle. The main traction batteries are usually located on the service deck 31 of the tail section module 14. An APU 7 could be located in the front end module 12, the rear end module 14, or in an expansion band 16. It is likely that whichever module carried the APU 7 would also carry a fuel tank and possibly the engine controller. The engine controller could plug into a twisted wire pair CAN extender 56 for the public CAN bus 18. A few expansion bands 16 specialized for providing range extending auxiliary power generation could be used to provide more flexibility across a fleet of vehicles. Although not shown, independent in-wheel motors could also be used in the front, rear or both. This would create a direct drive independent suspension with greater energy conversion efficiency at the cost of additional fraction motors.

Figure 7:
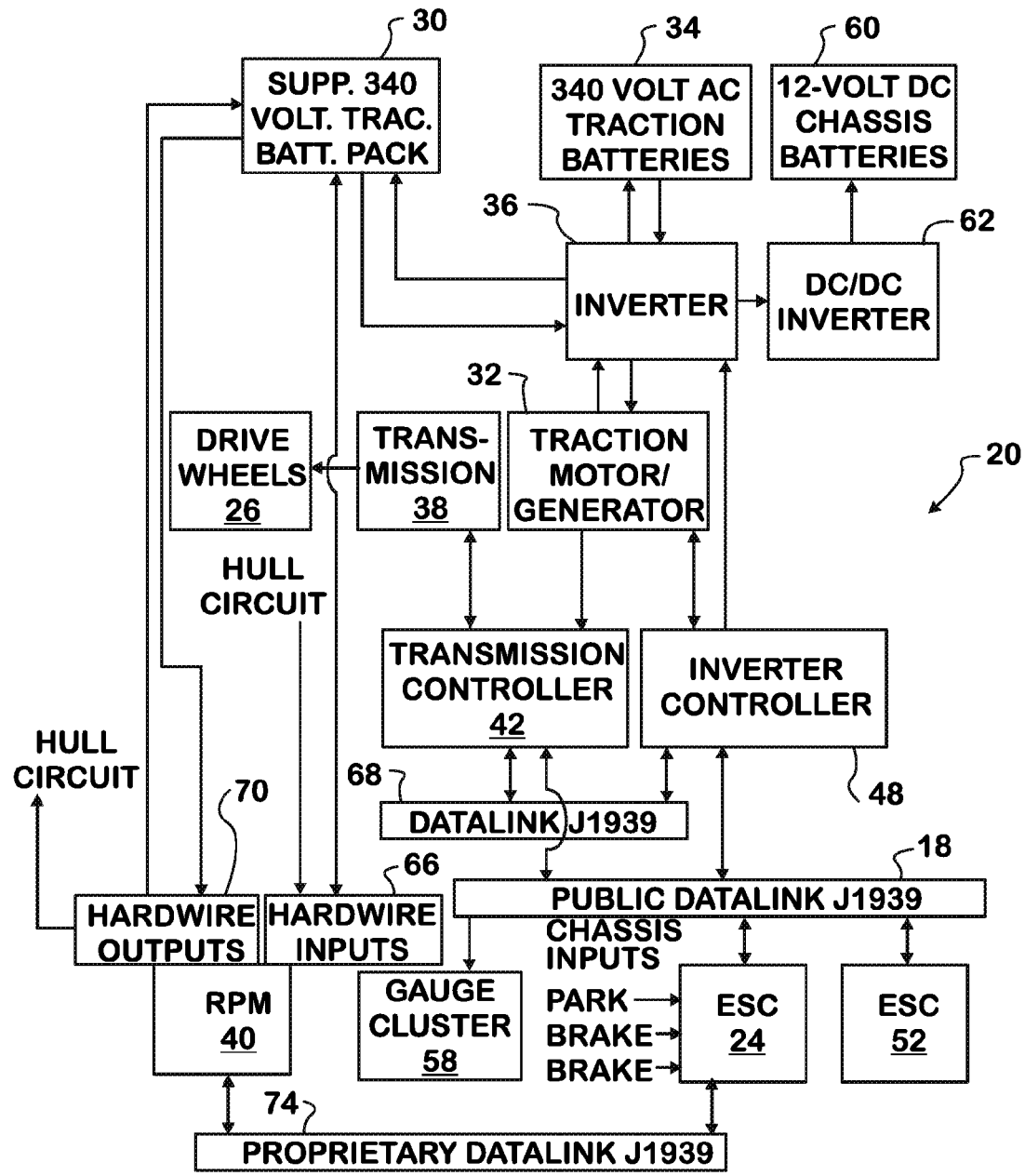
FIG. 7 is a control schematic usable for the power train shown in FIG. 6.

Referring to FIG. 7, a high level schematic of a control system 20 representative of a system usable with a vehicle 10 control is illustrated where vehicle 10 is an electric vehicle. Vehicle 10 may be built with a hybrid or conventional power system with suitable modification of the control system. An electrical system controller (ESC) 24, a type of a body computer, is linked by a public datalink 18 (here illustrated as a SAE compliant J1939 CAN bus) to a variety of local controllers which in turn implement direct control over most vehicle 10 functions. ESC 24 may also be directly connected to selected inputs and outputs and other busses which, among other functions, provide for incorporation and recognition of the presence of expansion bands 16. Direct "chassis inputs" include, a brake pedal position input and a park brake position sensor, which are connected to supply signals to the ESC 24. Other inputs to ESC 24 may exist. Four controllers in addition to the ESC 24 are illustrated connected to the public datalink 18. These controllers are the transmission controller 42, a gauge cluster controller 58, an inverter controller 48 and an antilock brake system controller (ABS) 50. Other controllers may exist on a given vehicle. Datalink 18 is the bus for a public controller area network (CAN) conforming to the SAE J1939 standard and under current practice supports data transmission at up to 250 Kbaud. ABS controller 50, as is conventional, controls application of brakes.

Vehicle 10 is illustrated as a electric vehicle which utilizes a traction motor/generator 32, to both deliver power to and absorb braking torque from the drive wheels 26. The system is intended to recapture the vehicle's inertial momentum during braking or slowing. The traction motor 32 is run as a generator from the wheels, and the generated electricity is ultimately stored in fraction batteries 34 and supplemental traction batteries 30, if present. Ultra-capacitors 8 may be used to capture power generated during braking and then provide for trickle charging of the batteries 30, 34. Later the stored electrical power can be used to run the traction motor 32.

The vehicle 10 drive train provides for the recapture of kinetic energy in response to the traction motor/generator 32 being back driven by the vehicle's kinetic force. The transitions between positive and negative traction motor contribution are detected and managed by an inverter controller 48. Traction motor/generator 32, during braking, generates electricity which is applied to fraction batteries 34 through inverter 36. Hybrid controller 48 looks at the ABS controller 50 datalink traffic to determine if regenerative kinetic braking would increase or enhance a wheel slippage condition if regenerative braking were initiated. Transmission controller 42 detects related data traffic on datalink 18 and translates these data as control signals for application to hybrid controller 48 over datalink 68. Traction motor/generator 32, during braking, generates electricity which is applied to the traction batteries 34 and to supplemental fraction batteries 30 if present through hybrid inverter 36. Some electrical power may be diverted from hybrid inverter to maintain the charge of a conventional 12-volt DC Chassis battery 60 through a voltage step down DC/DC inverter 62.

Traction batteries 30, 34 may be the only electrical power storage system for vehicle 10. In vehicles contemporary to the writing of this application numerous 12 volt applications remain in common use and vehicle 10 may be equipped with a parallel 12 volt system to support these systems. This possible parallel system is not shown for the sake of simplicity of illustration. Inclusion of such a parallel system would allow the use of readily available and inexpensive components designed for motor vehicle use, such as incandescent bulbs for illumination. However, using 12 volt components may incur a vehicle weight penalty and extra complexity. Inverter 36 supplies 3 phase 340 volt rms power to the traction motor.

Supplemental 340 volt traction battery packs 30 are carried on each expansion band 16. In addition each expansion band 16 will include a programmable interface (here a remote power module 40) which controls its local supplemental battery pack 30. Each supplemental battery pack may conveniently be arranged to operate at the same voltage as the main traction batteries 34 and electrical connections are provided which allow easy parallel connection of supplemental battery packs 30 with the main traction batteries 34. Supplemental batteries 30 should have the capacity to meet the anticipated load carried by the vehicle as a result of addition of the band. In addition, each RPM 40 can handle local electrical tasks associated with an expansion band 16, if any, through various hardwire inputs 66 and outputs 70. These may include monitoring integrity of the hull circuit. RPM 40 communicates with ESC 24 over a proprietary CAN bus 74.

Figure 8A:
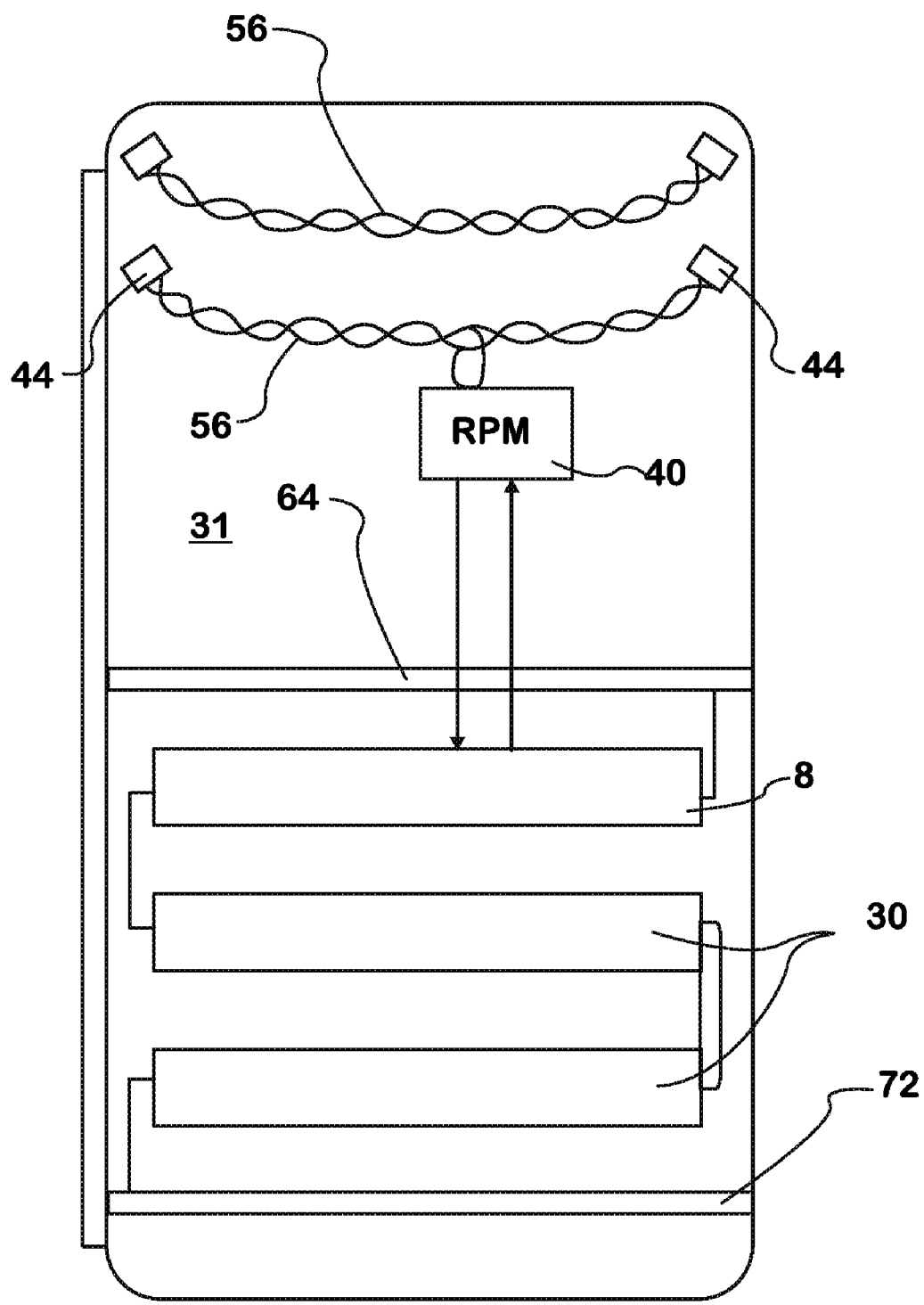
FIGS. 8A and B are plan views of alternative service deck arrangements for use with an expansion band or tail module.

FIG. 8A illustrates a possible layout for a service deck 31 on an expansion band 16 or passive tail section 14. Supplemental traction battery pack 30 is located connected between a ground connection 72 and a power bus 64. RPM 40 is connected to one of two twisted wire pairs 56. Twisted wire pairs 56 are the physical portions of the private and public vehicle CAN buses 74 and 18. Plug connectors 44 are shown at each end of the twisted wire pair 56 allowing connection to another twisted wire pair or introduction of a terminating impedance. A passive (i.e. non-drive wheel) tail module 14 may or may not carry supplemental batteries 30, or it may carry the main traction battery pack 34, however the RPM 40 may still be present to control optional accessories installed in the tail module, such as a loading ramp. Although not shown, expansion bands 16 may also provide control wires and instrumentation wires from the front end module 12 to the tail module 14 for brake control and lighting.

Figure 8B:
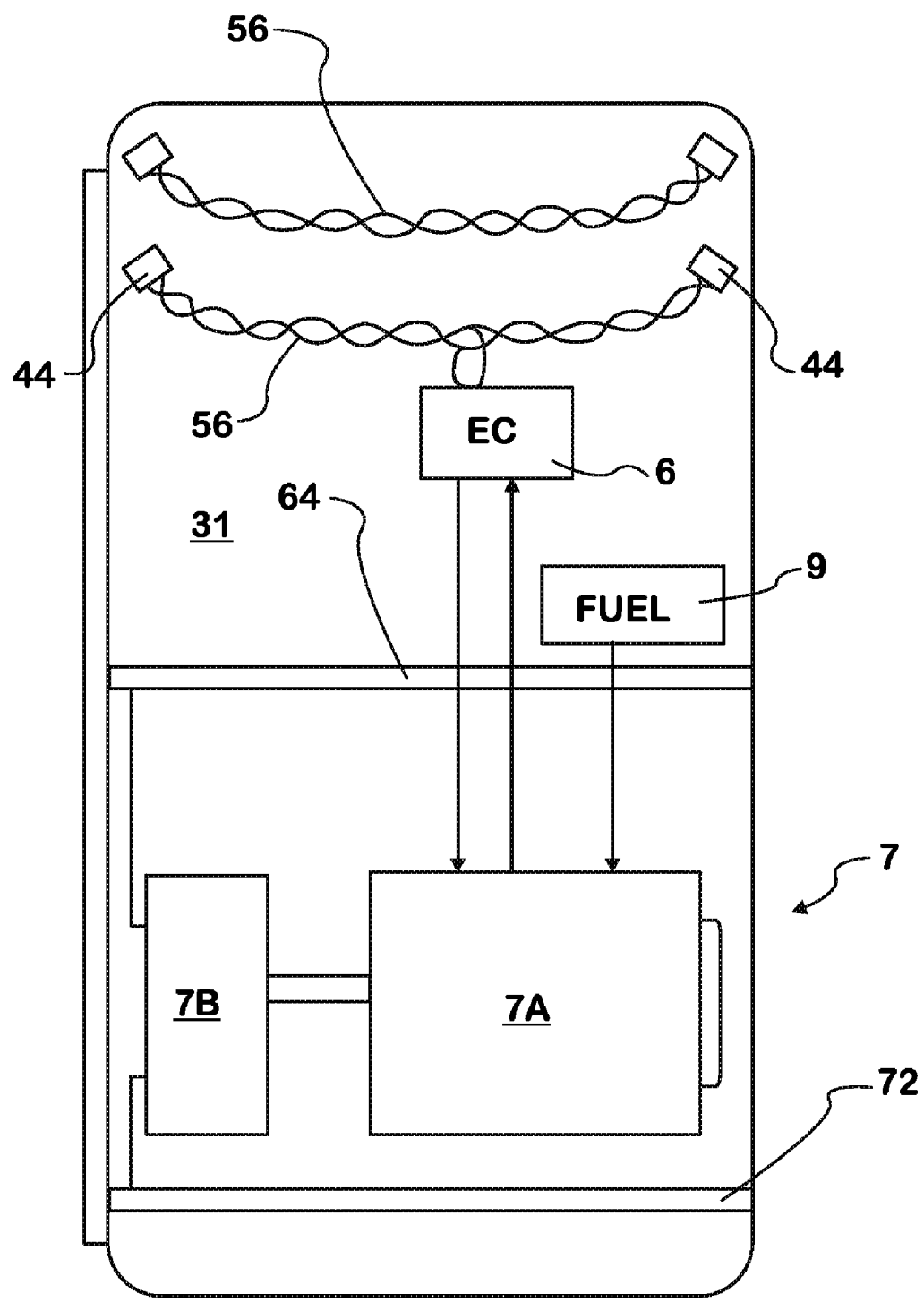

FIG. 8B illustrates a possible layout for a service deck 31 for a rear end module 14 or expansion band 16 modified to support an auxiliary power unit (APU) 7, here made up of an internal combustion engine 7A and a generator 7B. Generator 7B is connected across the vehicle power bus 64 and ground bus 72. An engine controller 6 provides for control over engine 7A and may be connected to communicate with other vehicle controllers over either the public CAN 18 or proprietary CAN 68 using the appropriate twisted wire pair CAN extender 56. A small fuel tank 9 may be located either inside or outside the expansion band 16.

What is claimed is:

1. A vehicle comprising:
   a front end module;
   a tail module;
   a first trailing edge of the front end module and a first leading edge of the tail module allowing temporary connection of the tail module and front end module for service use;
   a power train module adapted for installation under at least one of the front end module and the tail module;
   an expansion band, the expansion band having a second leading edge and a second trailing edge allowing temporary installation of at least one expansion band between the front end module and the tail module to adjust the length of the vehicle, wherein the power train module includes an electric traction motor, the front end module, tail module and expansion band are one piece molded composite elements, wherein the tail module and the expansion band each include integral shelving;
   a service deck defined on a portion of an interior of the expansion band and the tail module; and
   traction battery packs installed on the service deck.

2. The vehicle as set forth in claim 1 further comprising:
   at least two expansion bands located in series between the front end module and the tail module to adjust the length of the vehicle.

3. The vehicle as set forth in claim 1, wherein the front end module, the tail module and the expansion band are formed as one piece monocoque elements.

4. The vehicle as set forth in claim 1, further comprising:
pass through control, power and instrumentation connections operatively connected to the expansion band.

5. The vehicle as set forth in claim 4, further comprising:
an auxiliary power unit installed on the power train module.

6. A vehicle comprising:
a front end module molded in one piece from composite material to form a monocoque hull element;
a tail module molded in one piece from composite material to form a monocoque hull element;
a trailing edge from the front end module and a leading edge to the tail module allowing temporary connection of the tail module and front end module for service use;
a power train module adapted for installation under at least one of the front end module and the tail module;
an expansion band, the expansion band having a leading edge and a trailing edge allowing temporary installation between the front end module and the tail module to adjust vehicle length;
the expansion band being formed as a one piece monocoque element;
the power train module including an electric traction motor;
a service deck disposed on an interior of the expansion band and tail module;
a removable floor disposed over the service deck; and
traction battery packs installed on the service deck.

7. A vehicle as set forth in claim 6, further comprising:
pass through control, power and instrumentation connections associated with the expansion band.

* * * * *